(12) United States Patent
Hoffman et al.

(10) Patent No.: US 6,679,527 B2
(45) Date of Patent: Jan. 20, 2004

(54) PUSH-TO-CONNECT FITTINGS FOR AIR BRAKE RESERVOIRS

(75) Inventors: Fred Hoffman, Columbia Station, OH (US); Leonard Quinn, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 48 days.

(21) Appl. No.: 09/971,411

(22) Filed: Oct. 5, 2001

(65) Prior Publication Data

US 2003/0067164 A1 Apr. 10, 2003

(51) Int. Cl.[7] .............................................. F16L 37/084
(52) U.S. Cl. ...................... 285/190; 285/322; 285/323
(58) Field of Search ................................ 285/190, 322, 285/323, 205, 201

(56) References Cited

U.S. PATENT DOCUMENTS

| | | |
|---|---|---|
| 1,816,004 A | 7/1931 | Collier |
| 2,083,970 A | 6/1937 | Walter |
| 2,787,499 A * | 4/1957 | Rolston ....................... 239/259 |
| 3,424,481 A * | 1/1969 | Fulghum .................. 285/140.1 |
| 3,736,986 A | 6/1973 | Magdars |
| 4,289,334 A * | 9/1981 | Riley ............................ 285/55 |
| 4,679,829 A * | 7/1987 | Yanagisawa ................. 285/190 |
| 5,468,028 A * | 11/1995 | Olson .......................... 285/322 |
| 5,474,336 A * | 12/1995 | Hoff et al. ................... 285/322 |
| 5,524,938 A * | 6/1996 | Halder ........................ 285/201 |
| 5,607,189 A | 3/1997 | Howeth |
| 5,681,061 A * | 10/1997 | Olson .......................... 285/322 |
| 6,158,783 A | 12/2000 | Johnson |

FOREIGN PATENT DOCUMENTS

| | | | |
|---|---|---|---|
| CH | 407678 | * 9/1966 | .................. 285/190 |
| EP | 0 287 446 | 4/1988 | |
| EP | 0 843 121 | 5/1998 | |
| EP | 1 065 427 | 3/2001 | |
| RU | 1608395 | * 11/1990 | .................. 285/190 |

* cited by examiner

Primary Examiner—Lynne H. Browne
Assistant Examiner—Giovanna Collins

(57) ABSTRACT

A serviceable design for a pressure vessel or reservoir includes a removable retainer accessible from a location external to the reservoir. Many existing, commercially available components can be used with only slight modification while providing ease of access to repair/replace seal members if so desired.

9 Claims, 4 Drawing Sheets

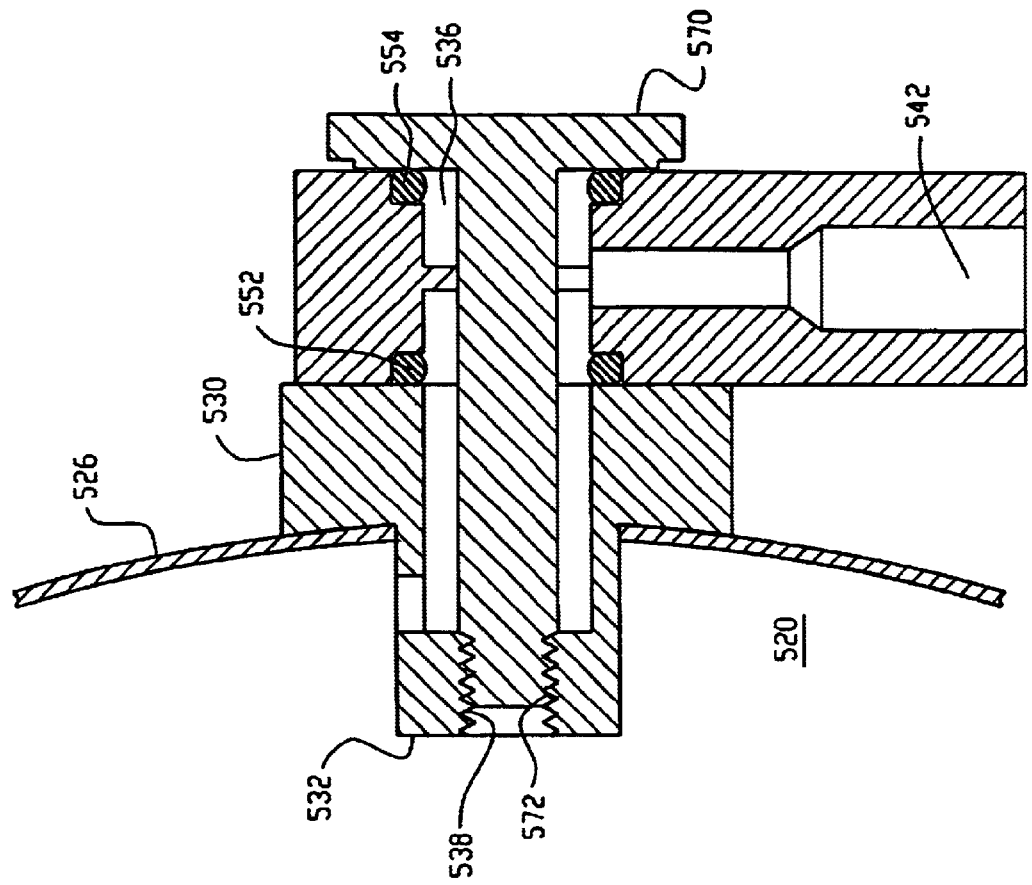
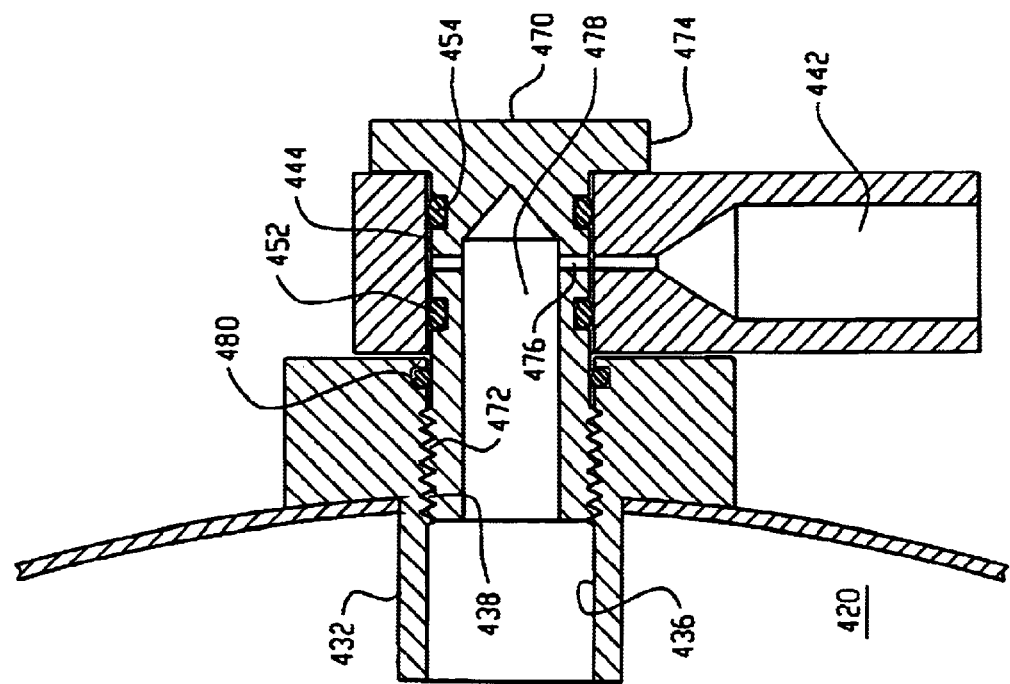
Fig. 6
Fig. 5

PUSH-TO-CONNECT FITTINGS FOR AIR BRAKE RESERVOIRS

FIELD OF THE INVENTION

This application relates to reservoirs, and more particularly to serviceable push-to-connect fittings used to connect valves, air lines, and other air operated devices to an air brake reservoir.

DISCUSSION OF THE ART

Heavy vehicle manufacturing companies prefer to use push-to-connect fittings on vehicles they manufacture in order to reduce assembly times and eliminate air leakage. Push-to-connect fittings have been developed for a wide range of uses including valves and other air operated devices; however, to date a serviceable push-to-connect design for air reservoirs has not been developed. It is important that one or more sealing members such as O-rings incorporated into the fitting design can be serviced or replaced in an economical manner. Previously, such repair or replacement encountered substantial cost, oftentimes requiring replacement of the entire reservoir.

In commercially available air brake reservoirs, a ferrule or connector is typically secured to the reservoir and adapted to receive a fitting that establishes air pressure communication between the interior of the reservoir and an external use. For example, ferrules of this type are normally of steel construction and welded to the reservoir. The heat generated during the welding process removes or destroys plating on the steel ferrule, if present, and over time corrosion develops along this unprotected site on the steel ferrule. This, in turn, causes the O-ring seal to leak thus requiring service or repair.

To resolve this problem, it would be desirable to use existing or similar components already presently being manufactured in a manner that overcomes these problems. Using existing inventory with either no or slight modification is always desirable. Accordingly, a new push-to-connect fitting that provides ease of access to the seal members without undue expense or modification of existing components is sought.

BRIEF SUMMARY OF THE INVENTION

An air reservoir for heavy vehicles includes a push-to-connect fitting assembly that is serviceable, thereby allowing the seal member to be easily replaced.

A preferred push-to-connect fitting assembly for air brake reservoirs includes a ferrule permanently secured to an opening in the reservoir shell to prevent leakage. The ferrule is adapted to removably receive a push-to-connect fitting and thereby provide supply air to brakes and other air operated devices associated with the heavy vehicle.

A preferred embodiment of the invention includes a reservoir including an opening in which is permanently secured a ferrule. The ferrule has an opening therethrough that communicates with the interior of the reservoir. A push-to-connect fitting communicates with the opening in the ferrule. The push-to-connect fitting is removably secured to the ferrule so that a seal member interposed between the fitting and ferrule may be selectively repaired or replaced.

Another embodiment of the invention uses an external retaining clip to removably secure the push-to-connect fitting to the ferrule.

In yet another embodiment, a retaining bolt removably secures the push-to-connect fitting to the ferrule.

A primary advantage of the invention is the ability to replace the sealing member in an economical manner.

Another advantage of the invention is the ability to replace the sealing member without replacing the entire reservoir.

Still another advantage of the invention is the ability to use existing components with only slight modification.

Still other benefits and advantages of the invention will become apparent to one skilled in the art upon a reading and understanding of the following detailed description.

BRIEF DESCRIPTION OF THE DRAWINGS

FIGS. 3–6 are longitudinal cross-sectional view of alternative embodiments of the present invention.

DETAILED DESCRIPTION OF THE INVENTION

Figure 1:
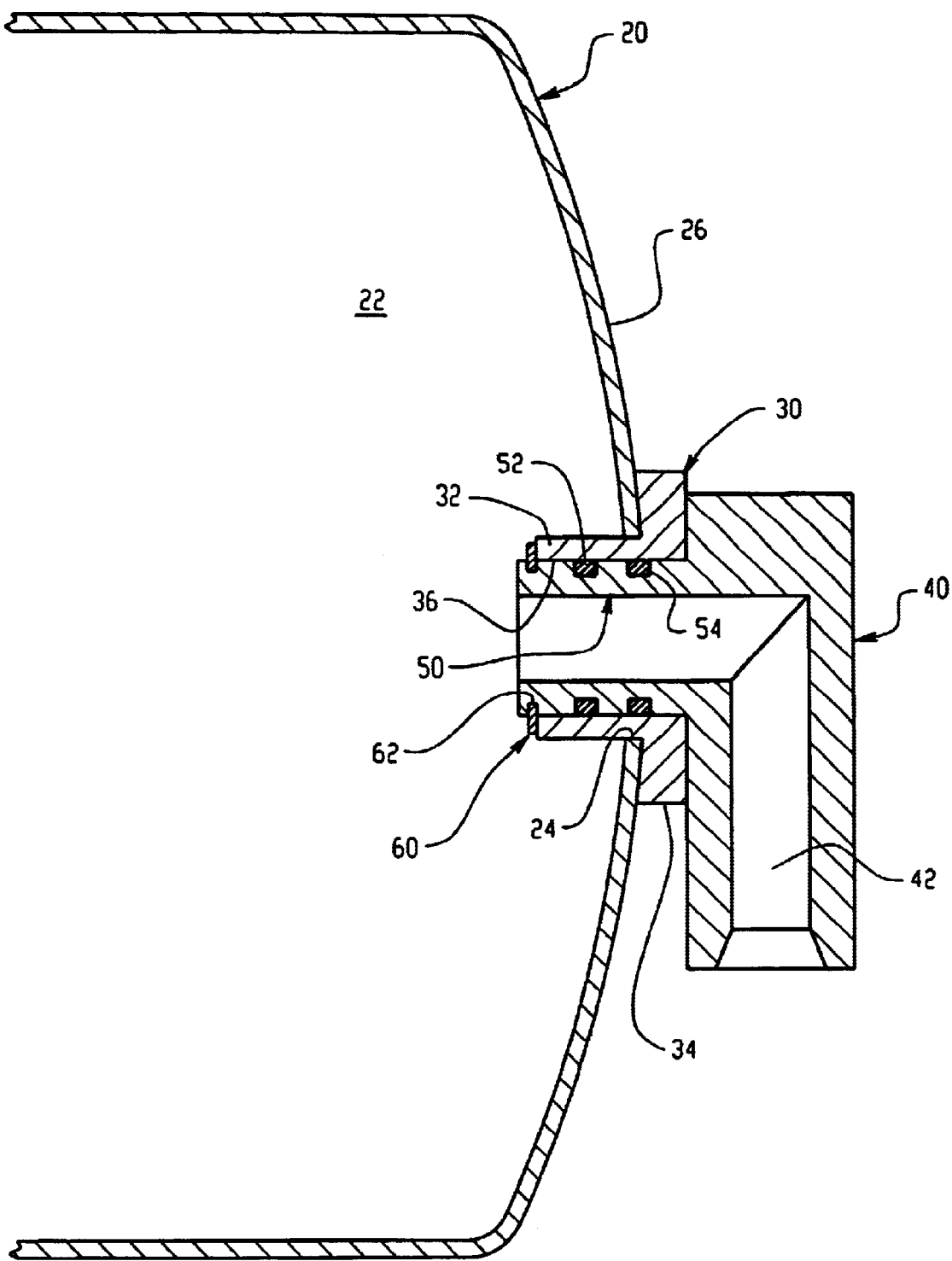
FIG. 1 is a cross-sectional view of a prior art connection of a push-to-connect fitting with a reservoir.

FIG. 1 is a conceptual illustration of a prior art coupling for a pressure vessel, generally described in U.S. Pat. No. 6,158,783. As shown in FIG. 1, a pressure vessel or reservoir 20 has an interior cavity or chamber 22 adapted to hold a supply of pressurized fluid, in this instance air, as particularly used to supply truck brakes or related air-operated devices (not shown). An opening 24 is provided in a wall 26 of the reservoir and adapted to receive a ferrule 30 therein. The ferrule 30 includes a hollow body 32 dimensioned for receipt through the opening and an enlarged head 34 that cannot pass through the opening and engages an external surface of the reservoir wall 26 to hold the ferrule in place. The ferrule is permanently secured to the reservoir, typically through a welding operation of the enlarged head 34 to the reservoir wall. It will be appreciated, however, that the ferrule may be permanently secured to the reservoir in other ways, such as swedging, pressing, etc.

A push-to-connect cartridge or fitting 40 is received in the ferrule and has an opening or passage 42 extending therethrough for communication with the reservoir chamber 22. The push-to-connect fitting is sealed relative to the ferrule, here employing a pair of seal member 50 such as first and second O-rings 52, 54. The push-to-connect fitting is secured to the ferrule via a retaining member or retaining ring 60. As shown in FIG. 1, the retaining ring is a split ring received in a groove 62 of the fitting body. The split ring collapses to a smaller diameter upon advancement of the fitting body into the bore of the ferrule. Once the split ring exits the ferrule at the interior of the reservoir, the split ring releases to an enlarged diameter, locked position as illustrated. The enlarged diameter of the split ring is received within a groove in the ferrule (not shown) or engages a radial shoulder of the ferrule, thereby lockingly securing the push-to-connect fitting within the ferrule. Again, more particular details of the structure and function of this known assembly is provided in U.S. Pat. No. 6,158,783.

Truck manufacturing companies want to continue to use push-to-connect fittings on their vehicles in order to reduce assembly time and eliminate air leakage. Push-to-connect fittings to date, of which FIG. 1 is but one example, have not provided a serviceable push-to-connect design. It is important that the design be made in such a manner that if the sealing member needs to be repaired or replaced, such servicing can be achieved in an economical manner. As will be appreciated, to access and/or replace the seal rings 52, 54 in the embodiment of FIG. 1 would require that the fitting and/or ferrule be removed from the reservoir with an attendant time and cost associated with the replacement or, if the reservoir is leaking air through this access, by replacing the reservoir in its entirety.

The present invention as exemplified in alternative preferred embodiments of FIGS. 2–6, incorporates a push-to-connect fitting that is affixed to the reservoir in a manner that makes it easily serviced. A ferrule is welded to the reservoir and yet is modified to provide ease of separable connection with the push-to-connect fitting. For example, the fitting is held in place by a retainer that is accessed externally to the reservoir to permit selective removal of the fitting and allow repair/replacement of the seal member(s).

As will be appreciated by one skilled in the art, welding the ferrule to the reservoir provides a permanent connection between the components but on occasion also creates problems. For example, welding the ferrule to the reservoir can result in distortion of the throughbore of the ferrule. Although the seal members adequately seal slight imperfections in the throughbore, significant deformation in the bore could lead to an inadequate seal at this interface. Likewise, ferrules are typically of steel construction and the heat generated during the welding process adversely impacts upon or destroys the protective plating. As noted above, corrosion will develop over time and cause the seal members to leak, thus requiring service or replacement even when the remaining components of the assembly have sufficient useful life remaining.

Figure 2:
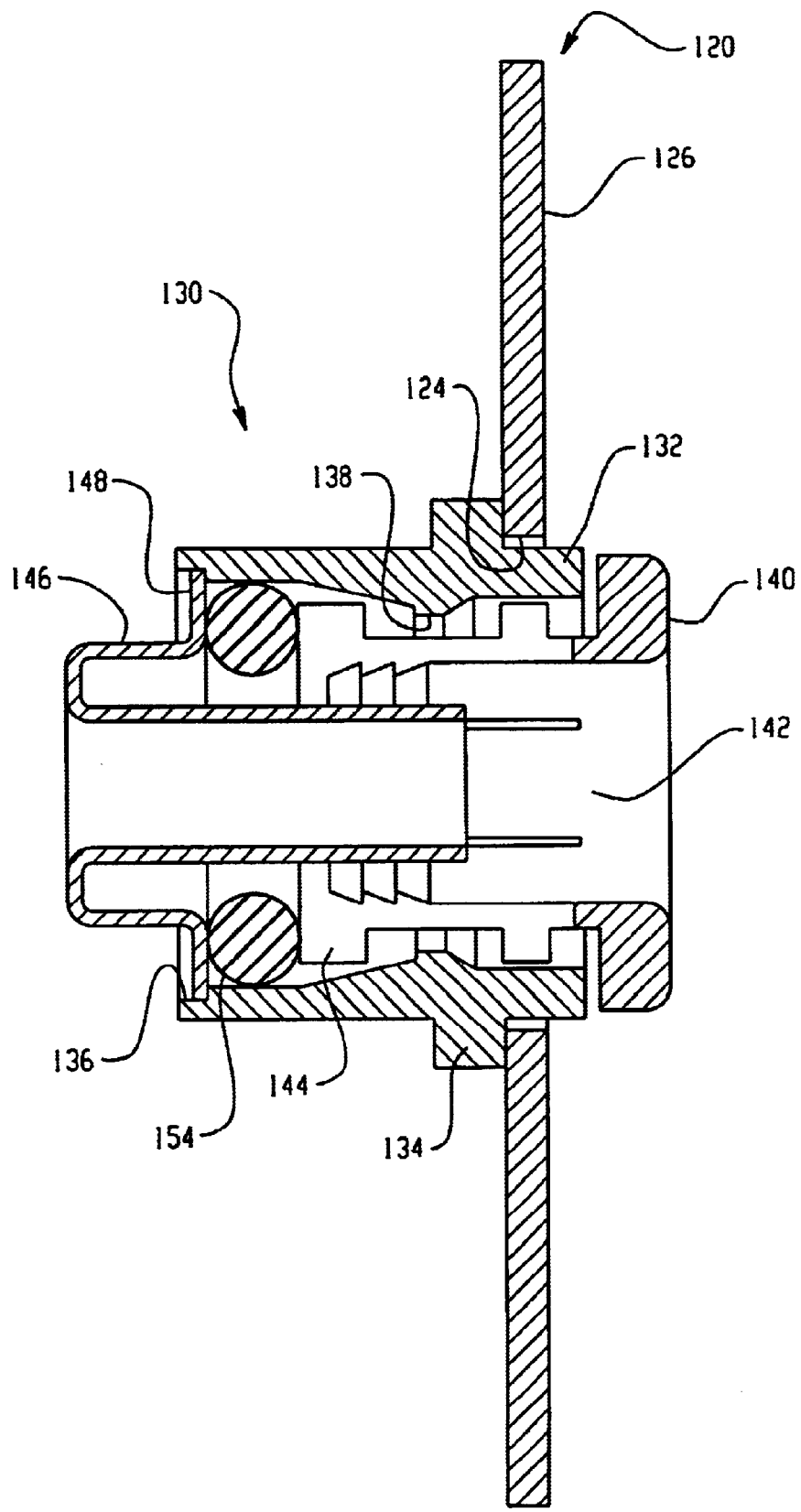
FIG. 2 is a longitudinal cross-sectional view of a first embodiment of the present invention.

For purposes of brevity and ease of understanding, like reference numerals with a 100-series prefix in FIG. 2 identify like components from FIG. 1 (for example, reservoir 20 in FIG. 1 is now referenced as reservoir 120 in FIG. 2) and new numerals are used to identify new components. The ferrule 130 includes a body 132 and an enlarged head 134 that is swedged, pressed, welded, or otherwise permanently secured to the reservoir in a manner that prevents leakage. As will be appreciated, the internal throughbore 136 of the ferrule has a preselected contour for receiving the push-to-connect fitting therein. Particularly, a reduced diameter shoulder 138 cooperates with the push-to-connect fitting 140. Here, the fitting is of a generally conventional type (akin to that shown and described in U.S. Pat. No. 6,158, 783) and includes an opening 142, collett 144, and an internal stiffening tube 146 that is secured at shoulder 148 to the ferrule. Seal ring 154 is selectively replaced by removing the push-to-connect fitting from the ferrule body. Specifically, the fitting is removed by axially retracting the fitting, and deflecting the collett radially inwardly to move axially past shoulder 138 of the ferrule to gain access to the seal member 154 for service or replacement. Thus, as will be appreciated, the O-ring can be serviced or replaced by removal of the fitting via a connection between the fitting and the ferrule that is accessible from the reservoir exterior.

Turning to FIG. 3, and again for purposes of brevity and consistency, like components will be referenced by like numerals with a 200-prefix when compared to the components identified in FIG. 1, e.g., the reservoir 20 in FIG. 1 will be now referred to as reservoir 220 in FIG. 3. Opening 224 in the reservoir wall 226 receives the ferrule 230 therein. The body 232 of the ferrule is dimensioned for receipt through the opening 224 while shoulder 234 is permanently secured to the reservoir wall, for example, by welding. The throughbore 236 of the ferrule is slightly modified to include a slot 238 for reasons which will become more apparent below. The push-to-connect fitting 240 includes standard grooves to receive seal rings 252, 254. The fitting 240 is also modified by including a corresponding slot 244 located opposite the slot 238 in the ferrule. The cooperating slots 238, 244 are adapted to receive an external retaining member such as a hairpin clip 260. Again, as will be appreciated, locating the retaining member at a region accessible from the exterior of the reservoir allows the push-to-connect fitting to be easily removed from the ferrule to service or replace the seal rings 252, 254.

Figure 4:
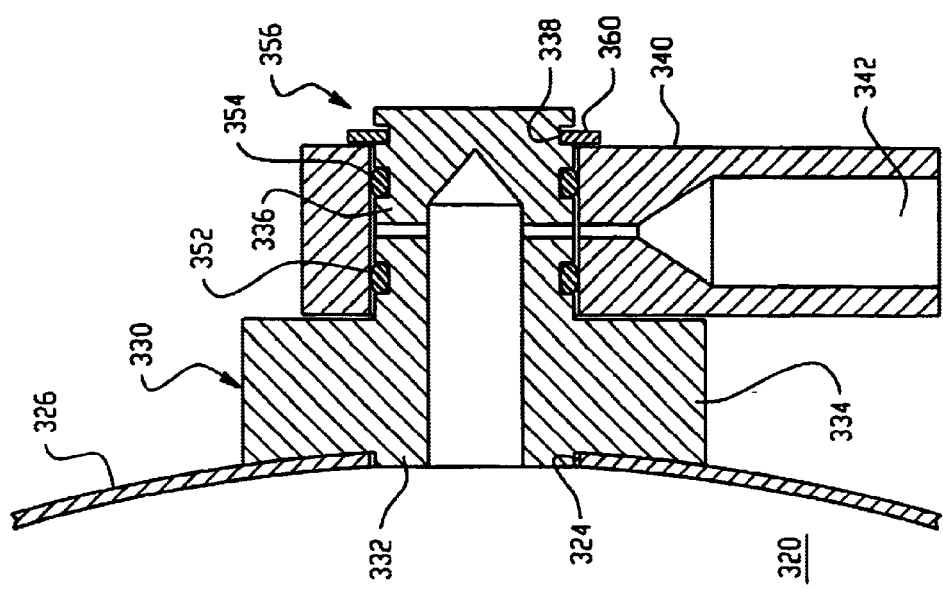
Figure 3A:
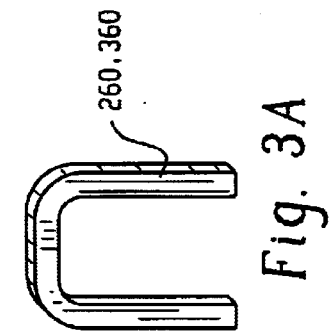
Figure 3:
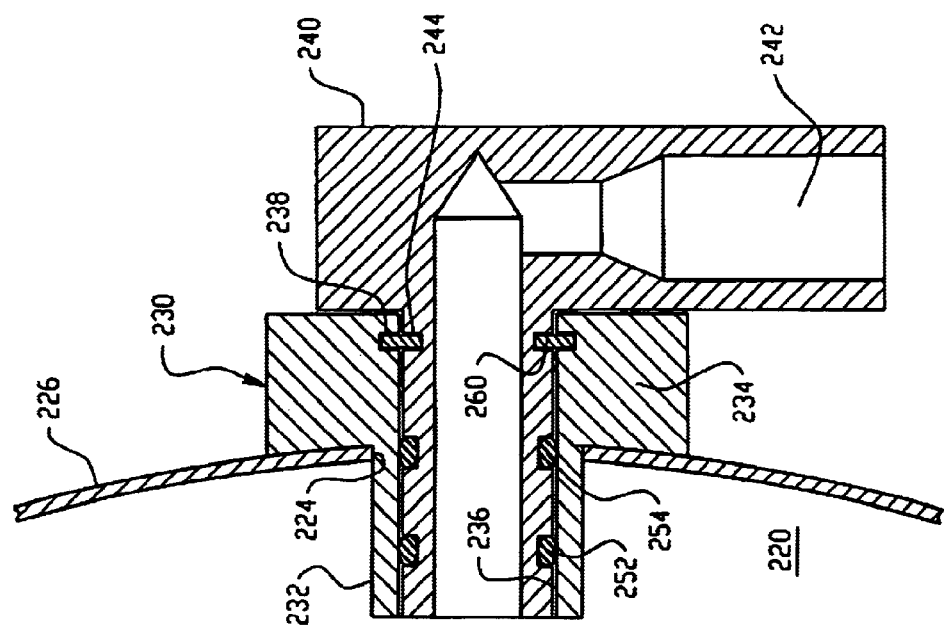

In FIG. 4, like components are identified with a 300 series prefix. A similar external retaining clip or snap ring 360 interconnects the push-to-connect fitting with the ferrule. Here, however, the ferrule is modified to include a body extension 356 that extends in an opposite axial direction from the opening 324 in the reservoir. The body extension 356 includes an external groove 338 at an outer axial end adapted to receive the retaining clip 360 and thereby secure the push-to-connect fitting to the ferrule at a region accessible from the exterior of the reservoir. By selectively removing the clip or snap ring 360, the push-to-connect fitting 340 can be axially removed from the body extension 336 and the seal members 352, 354 easily serviced or replaced.

Like components of FIG. 5 are referenced with a 400 series prefix, while new components receive a new reference numeral where no corresponding counterpart was present in the previously described embodiments. The ferrule 430 is modified so that the throughbore 436 is internally threaded as represented by reference numeral 438. The internal threads are adapted to receive a specialized or modified retaining fastener or bolt 470. The fastener is externally threaded at a first or inner end 472 and has an enlarged head 474 at a second or outer end that prevents further axial advancement of the fastener through a cross bore 444 formed in the push-to-connect fitting. The bolt also includes a cross passage 476 that communicates with the passage 442 of the fitting and an interior passage 478 that preferably extends axially along the shank of the fastener for communication with the internal chamber of the reservoir. The seal rings 452, 454 are interposed between the shank of the retaining fastener and the cross bore 444 in the fitting. An additional seal member or ring 480 is required adjacent the fastener threads to seal between the fastener and ferrule. Once again, the removable retaining fastener or bolt 470 is accessible from a location external to the reservoir. By removing the retaining fastener 470, the seal rings 452, 454 on the shank of the fastener are easily accessed for replacement if necessary. Likewise, the seal ring 480 can also be replaced if required.

The embodiment of FIG. 6 has some similiarities to that of FIG. 5 and, in the pattern used with the other embodiments, refers to like components with like reference numerals with a 500 series prefix. Particularly, the retaining fastener 570 includes external threads 572 that cooperate with internal threads 538 of a modified ferrule. An internal passage 536 of the ferrule is enlarged to define annular communication around the shank of the retaining fastener. In this manner, the passage 542 through the push-to-connect fitting can communicate with the interior chamber of the reservoir. It will also be appreciated that the seal rings 552, 554 are slightly modified relative to that shown in FIG. 5. Here, grooves are formed in the fitting to receive the seal rings and provide an axial seal between the fitting and ferrule (seal member 552) and the fitting and retaining fastener (seal member 554). This arrangement, however, still retains the advantageous feature of allowing service access at a location external to the reservoir. Simply unthreading the fastener allows access to one or both of the seal rings 552, 554 as may be desired.

The invention has been described with reference to illustrative embodiments. Obviously, modifications and alterations will occur to others upon a reading and understanding of the preceding detailed description. For example, frangible retaining tangs could be employed on an inner, inserted end of the push-to-connect fitting. In response to a predetermined pull-out force, the tangs or another portion of the fitting would break. The broken portion would be advanced or pushed into the reservoir chamber/cavity and a new fitting inserted for continued use of the assembly. Alternative passage configurations are also contemplated, as well as related seal rig configurations, that serve the same purpose as those described in the illustrated and detailed descriptions of the preferred embodiments. It is intended that the invention be construed as including all such alterations and modifications insofar as they come within the scope of the appended claims or the equivalents thereof.

What is claimed is:

1. A fitting assembly for a reservoir comprising:

a ferrule permanently secured to an associated opening in the associated reservoir;

a fitting, dimensioned for receipt in the ferrule, including a body slidably received in the ferrule and a seal member interposed between the body and the ferrule; and a removable retainer interconnecting the ferrule to the fitting via a first slot in the ferrule, the removable retainer being located around the ferrule in a manner allowing access from an area external to the associated reservoir.

2. A fitting assembly for a reservoir comprising:

a ferrule permanently secured to an associated opening in the associated reservoir;

a fitting, dimensioned for receipt in the ferrule, including a passage that communicates with the associated reservoir; and a removable retainer interconnecting the ferrule to the fitting via a first slot in the ferrule, the removable retainer being located around the ferrule in a manner allowing access from an area external to the associated reservoir, and an opening through the fitting operatively connecting the ferrule and the fitting.

3. A fitting assembly for a reservoir comprising:

a ferrule permanently secured to an associated opening in the associated reservoir;

a fitting dimensioned for receipt in the ferrule; and a removable retainer interconnecting the ferrule to the fitting via a first slot in the ferrule, the removable retainer being located around the ferrule in a manner allowing access from an area external to the associated reservoir, the ferrule including an extension received through a fitting opening and a groove on the extension adapted to receive the removable retainer.

4. An air brake reservoir assembly comprising:

a reservoir including an opening;

a ferrule permanently secured in the reservoir opening and having an opening therethrough that communicates with the reservoir;

a push-to-connect fitting operatively associated with the ferrule and communicating with the ferrule opening;

a removable retainer positioned around the ferrule and interconnecting the push-to-connect fitting and the ferrule; and a seal member interposed between the fitting and ferrule that is accessible upon removal of the retainer for selective one of repair and replacement.

5. The assembly of claim 4 wherein the retainer is located externally of the reservoir.

6. The assembly of claim 4 wherein at least one of the ferrule and fitting includes a groove adapted to receive the removable retainer.

7. The assembly of claim 4 wherein the fitting includes a passage that communicates with the associated reservoir, and an opening therethrough that operatively connects the ferrule and the fitting.

8. The assembly of claim 7 wherein the ferrule includes an extension received through the fitting opening and a groove on the extension adapted to receive the removable retainer.

9. A fitting assembly for a reservoir, comprising:

a ferrule, including a first passage, permanently secured to an associated opening in the associated reservoir;

a fitting including a second passage;

a removable retainer secured within the first passage and interconnecting the ferrule to the fitting, the second passage communicating with the first passage and the associated reservoir when the ferrule is interconnected to the fitting via the retainer; and a seal member interposed between the fitting and ferrule that is accessible upon removal of the retainer for selective one of repair and replacement.

\* \* \* \* \*